(12) United States Patent
Eisenbarth (10) Patent No.: US 8,950,757 B2
(45) Date of Patent: Feb. 10, 2015

(54) DEVICE FOR THE COMPENSATION OF BODY MOVEMENTS OF A MOTOR VEHICLE

(71) Applicant: Dr. Ing. h. c. F. Porsche Aktiengesellschaft, Stuttgart (DE)

(72) Inventor: Markus Eisenbarth, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 14/107,406

(22) Filed: Dec. 16, 2013

(65) Prior Publication Data

US 2014/0167370 A1   Jun. 19, 2014

(30) Foreign Application Priority Data

Dec. 18, 2012 (DE) .......................... 10 2012 112 466

(51) Int. Cl.
*B60G 17/04* (2006.01)
(52) U.S. Cl.
CPC ...................................... *B60G 17/04* (2013.01)
USPC ....................................................... 280/5.513
(58) Field of Classification Search
USPC ................. 280/5.506, 5.507, 5.513, 124.104, 280/124.106, 124.158, 124.159, 124.16, 280/124.161
See application file for complete search history.

(56) References Cited

U.S. PATENT DOCUMENTS

| 2,184,202 | A | | 12/1937 | Tschanz |
| 3,752,497 | A | | 8/1973 | Enke et al. |
| 4,295,660 | A | | 10/1981 | Toti et al. |
| 5,601,306 | A | * | 2/1997 | Heyring ..................... 280/5.508 |
| 5,601,307 | A | | 2/1997 | Heyring et al. |
| 6,010,139 | A | | 1/2000 | Heyring et al. |
| 6,519,517 | B1 | * | 2/2003 | Heyring et al. ................. 701/37 |
| 6,604,034 | B1 | * | 8/2003 | Speck et al. .................... 701/37 |
| 7,150,457 | B2 | * | 12/2006 | Rautenbach ............... 280/5.507 |
| 7,168,720 | B2 | * | 1/2007 | Fontdecaba Buj ..... 280/124.159 |
| 7,390,001 | B2 | * | 6/2008 | Mizuno ................. 280/124.104 |

(Continued)

FOREIGN PATENT DOCUMENTS

| DE | 2048323 A1 | 4/1972 |
| DE | 2923357 A1 | 12/1979 |

(Continued)

OTHER PUBLICATIONS

German Search Report, dated Jul. 17, 2013, corresponding to German counterpart Patent Application No. 10 2012 112 466.3, with partial English translation.

*Primary Examiner* — Paul N Dickson
*Assistant Examiner* — Robert A Coker
(74) *Attorney, Agent, or Firm* — RatnerPrestia (57) ABSTRACT

A device for the compensation of body movements in a motor vehicle, having an arrangement of four first piston-cylinder units which are assigned to in each case one wheel of the motor vehicle, wherein a compensation unit is provided which has a fifth piston-cylinder unit and a sixth piston-cylinder unit, wherein the pistons of the fifth piston-cylinder unit and of the sixth piston-cylinder unit are connected to one another via a coupling element, wherein at least a first number of the first piston-cylinder units and the fifth piston-cylinder unit are in fluid communication with one another and at least a second number of the first piston-cylinder units and the sixth piston-cylinder unit are in fluid communication with one another, and the compensation unit has means for compensating body movements.

8 Claims, 5 Drawing Sheets

(56) References Cited

U.S. PATENT DOCUMENTS 8,544,863 B2 * 10/2013 Revill et al. ............. 280/124.16
2005/0001389 A1 1/2005 Lin
2006/0151969 A1 7/2006 Revill et al.

FOREIGN PATENT DOCUMENTS

| DE | 69531448 T2 | 7/2004 |
| DE | 60317928 T2 | 11/2008 |
| WO | WO 2006/092013 A1 | 9/2006 |

* cited by examiner

DEVICE FOR THE COMPENSATION OF BODY MOVEMENTS OF A MOTOR VEHICLE

CROSS-REFERENCE TO RELATED APPLICATIONS

This application claims priority to German Patent Application No. 10 2012 112 466.3, filed Dec. 18, 2012, which is incorporated by reference herein in its entirety.

FIELD OF THE INVENTION

The invention relates to a device for the compensation of body movements in a motor vehicle, having an arrangement of four first piston-cylinder units which are assigned to in each case one wheel of the motor vehicle.

BACKGROUND OF THE INVENTION

While travelling, motor vehicles are subject to excitations which lead to both pitching and also rolling movements of the body. Said excitations may be caused for example by the roadway or by the respective driving situation.

Here, intense acceleration maneuvers or braking maneuvers in particular lead to pitching movements of the body. Fast cornering leads to rolling movements of the body.

To increase comfort for the occupants and to permit dynamic driving maneuvers, solutions are known in the prior art which effect a compensation of the pitching and rolling movements.

A disadvantage of the solutions according to the prior art is that the known systems are of very complex construction and are very expensive.

SUMMARY OF THE INVENTION

Described herein is a device for the compensation of body movements which is optimized in relation to the prior art.

An exemplary embodiment of the invention relates to a device for the compensation of body movements in a motor vehicle, having an arrangement of four first piston-cylinder units which are assigned to in each case one wheel of the motor vehicle, wherein a compensation unit is provided which has a fifth piston-cylinder unit and a sixth piston-cylinder unit, wherein the pistons of the fifth piston-cylinder unit and of the sixth piston-cylinder unit are connected to one another via a coupling element, wherein at least a first number of the first piston-cylinder units and the fifth piston-cylinder unit are in fluid communication with one another and at least a second number of the first piston-cylinder units and the sixth piston-cylinder unit are in fluid communication with one another, and the compensation unit has means for compensating body movements.

By means of a compensation unit which counteracts the movement of the body, it is firstly possible for driving comfort to be increased, and it is also possible for driving dynamics to be improved.

It is also advantageous if each piston-cylinder unit has a piston which is axially movable in the cylinder, wherein, at both sides of the piston, there is provided in each case one volume, wherein the first piston-cylinder unit has a first volume and a second volume, the second piston-cylinder unit has a third volume and a fourth volume, the third piston-cylinder unit has a fifth volume and a sixth volume, and the fourth piston-cylinder unit has a seventh volume and an eighth volume, wherein the fifth piston-cylinder unit has a ninth volume and a tenth volume, and the sixth piston-cylinder unit has an eleventh volume and a twelfth volume.

A device for the compensation of body movements can be realized in a particularly advantageous manner through the use of the described piston-cylinder units, because simple coupling between the body and the chassis can be realized by means of said piston-cylinder units.

It may furthermore be advantageous if the first to eighth volumes have in each case one fluid port, and the ninth to twelfth volumes have in each case two fluid ports.

It may also be expedient if the eleventh volume is in fluid communication with the first volume and with the sixth volume, wherein the twelfth volume is in fluid communication with the second volume and the fifth volume, wherein the ninth volume is in fluid communication with the third volume and the eighth volume, wherein the tenth volume is in fluid communication with the fourth volume and the seventh volume.

By means of such an interconnection of the volumes of the piston-cylinder units, it is possible to attain a crosswise connection between the piston-cylinder unit at the left-front wheel and the piston-cylinder unit at the right-rear wheel, and between the piston-cylinder unit at the right-front wheel and the piston-cylinder unit at the left-rear wheel. Particularly good compensation of body movements can be attained by means of such a crosswise interconnection.

It may furthermore be particularly advantageous if the means for compensating body movements has a first sensor element which senses a pitching movement of the body and/or has a second sensor element which senses a rolling movement of the body.

The body movement can be sensed in a particularly simple manner by means of sensor elements. As a sensor element, use may be made, for example, of position sensors, travel measurement sensors, GPS sensors or the like.

A preferred exemplary embodiment is characterized in that the means for compensating body movements has a first control element, which exerts a force and/or a moment on the coupling element as a function of the sensed pitching movement, and/or has a second control element, which exerts a force and/or a moment on the coupling element as a function of the sensed rolling movement.

The required force components for the active compensation of the body movements can be generated by means of the control elements. Here, the control elements may be realized for example by mechanical springs, hydraulic elements or electronic actuators.

It is also preferable if the first sensor element and/or the second sensor element is formed by an electronic unit and/or by a mechanical unit and/or by a hydraulic unit.

In a particularly expedient refinement of the invention, it is also provided that the first control element and/or the second control element is formed by an electronic unit and/or by a mechanical unit and/or by a hydraulic unit.

In an alternative refinement of the invention, it may be provided that the compensation unit is configured such that the piston of the fifth piston-cylinder unit and the piston of the sixth piston-cylinder unit are displaceable in the same direction or in opposite directions.

By means of a displacement in the same direction, it is for example possible for small pitching excitations to be compensated, whereas, by means of a displacement in opposite directions, small rolling movements can be compensated by virtue of in each case the piston of the fifth and sixth piston-cylinder units being displaced such that a change in volume at the piston-cylinder units assigned to the wheels is compensated by the movement of the pistons of the fifth and of the sixth piston-cylinder units.

A concept of the present invention is to realize coupling of the piston-cylinder units such that supporting springs of the motor vehicle do not generate rolling or pitching moments. Here, it is for example the case that air springs serve as supporting springs. It is however also conceivable to use steel springs as supporting springs.

It is also preferable if four air spring elements are provided which are assigned to in each case one of the wheels of the motor vehicle, wherein the air spring elements are in fluid communication with one another and/or with a switchable auxiliary volume.

By means of the air spring elements and in particular the switchable auxiliary volume, it is for example possible to attain a reduction in the stroke natural frequency. This makes a particularly great contribution to driving comfort in the event of low transverse and longitudinal accelerations.

Advantageous refinements of the present invention are described in the following description of the figures.

BRIEF DESCRIPTION OF THE DRAWINGS

The invention will be explained in detail below on the basis of an exemplary embodiment and with reference to the drawings, in which.

DETAILED DESCRIPTION OF THE INVENTION

Figure 1:
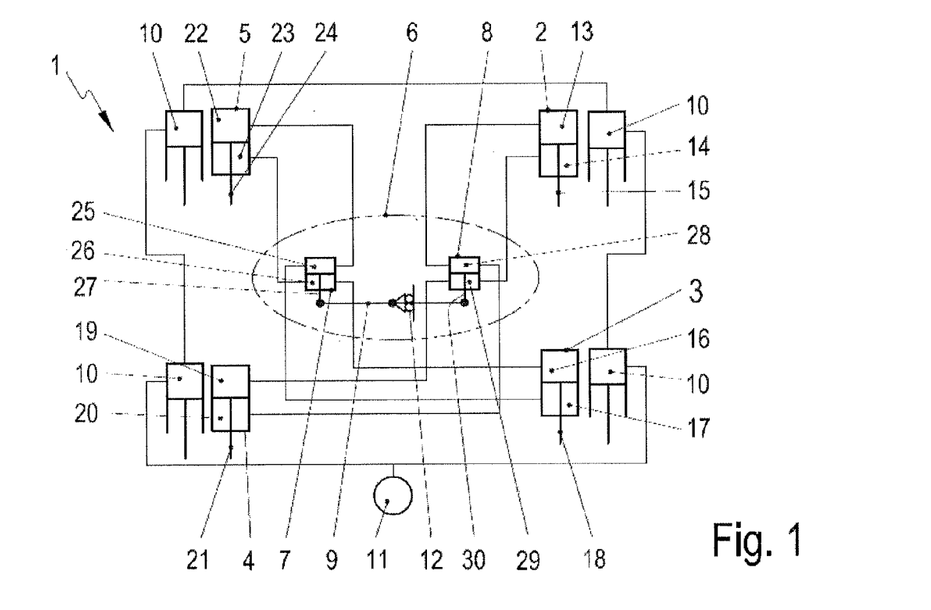
FIG. 1 shows a schematic view of the device for the compensation of body movements, said device being formed by four first piston-cylinder units and by a compensation unit which is formed by a fifth and a sixth piston-cylinder unit, wherein furthermore, four air spring elements are provided which are in fluid communication with one another and with an auxiliary volume.

FIG. 1 shows a schematic view of a device 1 for the compensation of body movements of a motor vehicle. For this purpose, the device 1 has four first piston-cylinder units 2, 3, 4, 5, which are assigned to in each case one wheel of the motor vehicle. Each of said piston-cylinder units 2, 3, 4, 5 has a piston 15, 18, 21, 24. Said pistons 15, 18, 21, 24 are axially movable within a cylinder of the piston-cylinder units 2, 3, 4, 5. At both sides of the pistons 15, 18, 21, 24, there is provided in each case one volume.

The piston-cylinder unit 2 has a first volume 13 above the piston 15 and a second volume 14 below the piston 15. The piston-cylinder unit 3 has a first volume 16 above the piston 18 and a second volume 17 below the piston 18. The piston-cylinder unit 4 has a first volume 19 above and a second volume 20 below the piston 21. Finally, the fourth piston-cylinder unit 5 has a first volume 22 above and a second volume 23 below the piston 24.

Here, in the exemplary embodiment shown, the piston-cylinder unit 5 is assigned to the left-front wheel, the piston-cylinder unit 2 is assigned to the right-front wheel, the piston-cylinder unit 3 is assigned to the right-rear wheel, and the piston-cylinder unit 4 is assigned to the left-rear wheel. A connection of the chassis to the body of the motor vehicle is realized by means of the piston-cylinder units 2, 3, 4, 5 and the air springs 10. In this way, changes in the pressure conditions in the piston-cylinder units 2, 3, 4, 5 influence the movement of the body relative to the chassis.

The assignment of the pistons to the individual piston-cylinder units and the volumes above and below the pistons are, in all subsequent figures, denoted by reference numerals corresponding to those in FIG. 1.

Air springs 10 are arranged in each case adjacent to the piston-cylinder units 2, 3, 4, 5. The air springs 10 are in fluid communication with one another and with a switchable auxiliary volume 11. The chassis is connected to the body in the region of a wheel by means of in each case one air spring 10 and one piston-cylinder unit 2, 3, 4, 5.

Illustrated centrally in the middle of FIG. 1 is a compensation unit 6. The compensation unit 6 is composed of two second piston-cylinder units 7, 8 which, analogously to the first four piston-cylinder units 2, 3, 4, 5, likewise have in each case one first volume above a piston 27, 30 and one second volume below a piston 27, 30 which is axially movable in the cylinder.

The piston-cylinder unit 7 has a first volume 25 above and a second volume 26 below the piston 27. The piston-cylinder unit 8 has a first volume 28 above and a second volume 29 below the piston 30.

The piston-cylinder unit 5 is in fluid communication with the piston-cylinder unit 7 and the piston-cylinder unit 3. The piston-cylinder unit 2 is in fluid communication with the piston-cylinder unit 8 and the piston-cylinder unit 4.

The volumes 25, 26, 28, 29 of the piston-cylinder units 7, 8 have in each case two fluid ports. The other volumes 13, 14, 16, 17, 19, 20, 22 and 23 have in each case only one fluid port.

The piston-cylinder units 2, 3, 4, 5 are connected to one another in a crosswise fashion, such that in each case the piston-cylinder unit 5 assigned to the left-front wheel is interconnected with the piston-cylinder unit 3 assigned to the right-rear wheel, and the piston-cylinder unit 2 assigned to the right-front wheel is interconnected with the piston-cylinder unit 4 assigned to the right-rear wheel.

In the embodiment shown in FIG. 1, the upper volume 22 of the piston-cylinder unit 5 is in fluid communication with the upper volume 25 of the piston-cylinder unit 7. The upper volume 25 is furthermore in fluid communication with the lower volume 17. The upper volume 16 is in turn in fluid communication with the lower volume 26, wherein the lower volume 26 is likewise in fluid communication with the lower volume 23.

An adjustment of the piston 24, 27 or 18 accordingly leads to a change in volume and thus a fluid displacement, which entails a movement of the respective other piston 24, 27, 18 of the piston-cylinder units 5, 7, 3 which are in fluid communication with one another.

The upper volume 13 is in fluid communication with the upper volume 28, wherein the upper volume 28 is likewise in fluid communication with the lower volume 20. The upper volume 19 is in turn in fluid communication with the lower volume 29, wherein the lower volume 29 is likewise in fluid communication with the lower volume 14.

The displacement of a piston 15, 30 or 21 thus likewise leads to a change in volume and to a fluid displacement, which results in a movement of the respective other piston 15, 30, 21.

The piston-cylinder unit 7 or the piston 27 is coupled to the piston 30 of the piston-cylinder unit 8 via a coupling element 9. Said coupling element 9 is mounted on a mounting 12. The coupling element 9 permits, along the mounting 12, a displacement of the pistons 30 and 27 in the same direction and also a displacement of the pistons 30 and 27 in opposite directions. For this purpose, the coupling element 9 is displaceable in a horizontal movement along the mounting 12. The coupling element 9 is likewise rotatable about the mounting 12.

The coupling element 9 may be formed for example by a mechanical component. In alternative embodiments, it may also be provided that the coupling of the pistons is realized by means of an electronic circuit or through the use of actuators or hydraulic control elements.

The basic design of the device 1 for the compensation of body movements and the arrangement of the individual components within said device 1 remain unchanged throughout the further subsequent FIGS. 2 to 10. A detailed description, for example of the piston-cylinder units and the interconnection thereof with one another, will not be given below.

Figure 2:
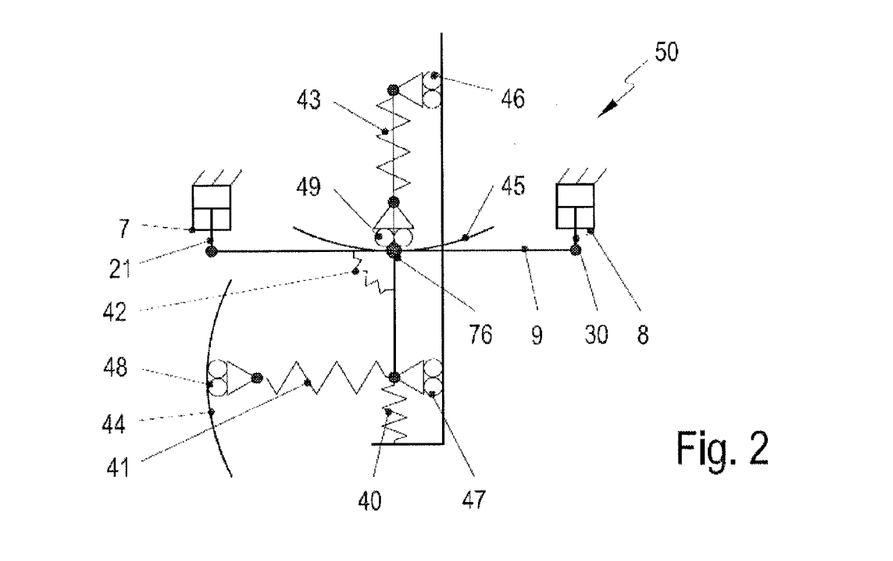
FIG. 2 shows a schematic view of the compensation unit, wherein said compensation unit has the fifth and the sixth piston-cylinder unit, and the pistons of the fifth and of the sixth piston-cylinder unit are connected to one another via a coupling element, wherein means for compensating body movements act on the coupling element.

FIG. 2 shows a schematic view of the compensation unit 50. The compensation unit 50 shown in FIG. 2 is a detail illustration of the compensation unit 6 already indicated in FIG. 1.

The mounting point 12 shown in FIG. 1 is illustrated in more detail in FIG. 2. The mounting of the coupling element 9 is in fact realized by means of four mounting points 46, 47, 48, 49. The mountings 46, 47 permit a vertical movement of the coupling element 9. The coupling element 9 is supported with respect to the mountings 46, 47, 48, 49 via multiple spring elements 40, 41, 42, 43. The mountings 48 and 49 permit a movement of the spring elements 43 and 41 along the respective curved path 44 and 45.

The spring elements 41 and 43 are already compressed. As a result of a deflection of the spring element 43, the direction of action of the force of the spring element 43 is changed owing to the guidance thereof on the curved path 45 which is positionally fixed relative to the compensation unit 50. As a result, a spring force is generated which acts on the compensation unit. In particular, the spring force of the spring element 43 results in the generation of a moment about the centre of rotation 76. Here, the moment is determined by the magnitude of the spring force of the spring element 43 and the lever arm between said spring force and the centre of rotation 76.

As a result of a deflection of the spring element 41 owing to a pitching excitation, the spring element 41 is compressed, whereby a force component 61 is generated which acts on the coupling element 9 and which counteracts a movement of the coupling element 9 downward.

A preload acts on the compensation unit 50 as a whole owing to the spring elements. For functional reasons, the spring elements 41 and 43 must be preloaded. The exact mode of operation of the compensation unit 50 will be explained in more detail in the following figures.

Figure 3:
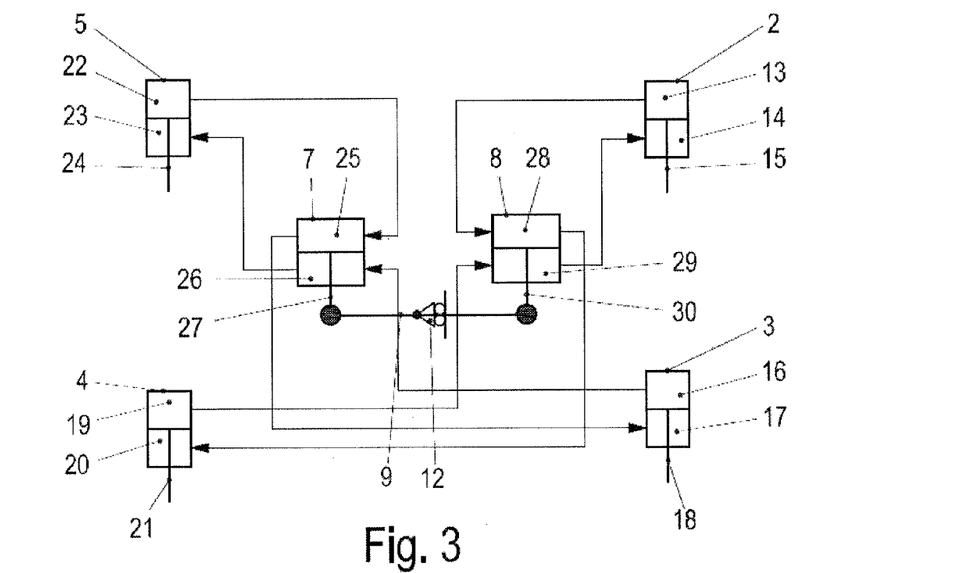
FIG. 3 shows a schematic view of the device for the compensation of body movements having the first piton-cylinder units and the compensation unit, wherein the figure shows a normal position in which no excitation acts on the device.

FIG. 3 shows an arrangement of the piston-cylinder units 2, 3, 4, 5, 7, 8 in a basic state in which no excitation acts on the vehicle.

The pistons 15, 18, 21, 24 and 27 and 30 are in this case situated in a central position within the cylinders, and the upper volumes and lower volumes are of approximately the same size. The coupling element 9 is mounted in its initial position on the mounting 12 and is not deflected, in particular because the pistons 27 and 30 are situated at the same level.

The pressures in the volumes 5, 25 and 17 and in the volumes 23, 27 and 16 and in the volumes 13, 28 and 20 and in the volumes 14, 29 and 19 are in each case identical. This arises as a result of the fluid communication of the volumes with one another and applies at least for steady states or approximately steady states. During dynamic maneuvers, temporary pressure differences may arise in the respective volumes owing to the inertia of the fluid.

Figure 4:
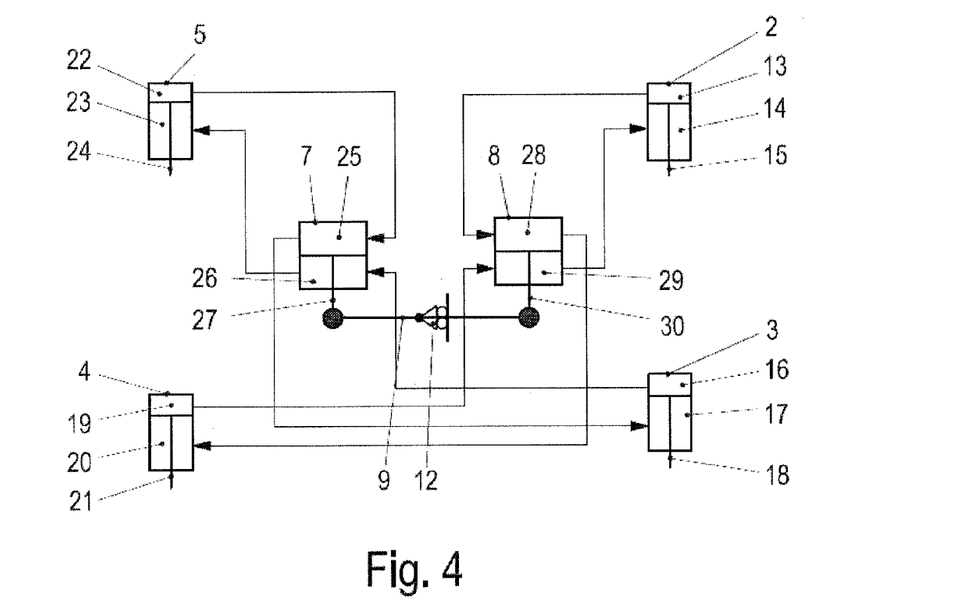
FIG. 4 shows a view as per FIG. 3, wherein a uniform stroke excitation is illustrated.

FIG. 4 shows the device 1 while it is being subjected to a uniform stroke excitation. A uniform stroke excitation should be understood to mean a movement of the vehicle body in a vertical direction, said movement being identical at all four wheels and thus also at all four piston-cylinder units 2, 3, 4, 5.

The stroke excitation leads to a retraction of the pistons 15, 18, 21, 24 into the corresponding piston-cylinder units 2, 3, 4, 5. As a result, the upper volumes 13, 16, 19, 22 are in each case decreased in size, and the lower volumes 14, 17, 20, 23 are in each case increased in size.

The fluid displaced out of the upper volume 22 flows into the upper volume 25 and onward from there into the lower volume 17. As a result of the upwardly directed movement of the piston 18, fluid is, so to speak, displaced from the upper volume 16, said fluid flowing into the lower volume 26. From the lower volume 26, the fluid flows onward into the lower volume 24. In this way, the volumes 25, 26 of the piston-cylinder unit 7 remain unchanged.

The changes of the pistons 15, 21 for the piston-cylinder units 2, 4 and for the interposed piston-cylinder unit 8 take place analogously.

The coupling element 9 remains, mounted by means of the mounting 12, in an unchanged position. The pistons 27 and 30 of the piston-cylinder units 7 and 8 remain unchanged in their central position which corresponds to the initial position shown in FIG. 3.

The pressures in the upper volumes 25, 28 and the pressures in the lower volumes 26, 29 of the piston-cylinder units 7, 8 are in equilibrium with one another.

The overall volume of the interconnected volumes 22, 25 and 17, and 23, 26 and 16, and 13, 28 and 20, and 14, 29 and 19, respectively, remains identical at all times. This is based on the fact that a non-compressible fluid preferably flows within the piston-cylinder units 2, 3, 4, 5, 6, 7, 8 and in the fluid lines that connect them.

Figure 5:
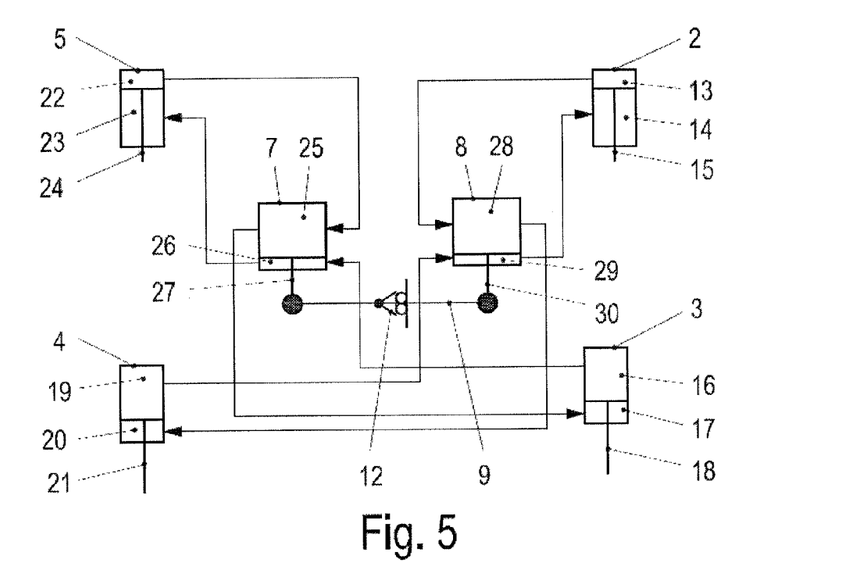
FIG. 5 shows a view as per FIG. 3, wherein a roadway-induced pitching excitation is illustrated.

FIG. 5 shows a state of the device 1 in which a roadway-induced pitching excitation occurs. In the case of a pitching excitation, the wheel loads acting on the two front wheels are changed in relation to those acting on the two rear wheels. Said change is relatively small in the case of a roadway-induced pitching excitation in relation to a pitching excitation caused for example by a braking or acceleration maneuver.

Said changing wheel loads result, as illustrated in FIG. 5, in an adjustment of the pistons 15 and 24 of the piston-cylinder units 2 and 5 assigned to the front wheels and in an adjustment of the pistons 18, 21 of the piston-cylinder units 3, 4 assigned to the rear wheels. As a result of the adjustment of the pistons 15, 24, the fluid is displaced out of the respective upper volume 13, 22. The fluid flows into the respective upper volume 28 or 25. The pistons 18 and 21 move in an opposite direction to the pistons 15, 24. As a result, the upper volumes 16 and 19 are increased in size, and the lower volumes 17 and 20 are decreased in size. Since the upper volume 16 is in fluid communication with the lower volume 26 and the upper volume 19 is likewise in fluid communication with the lower volume 29, and at the same time the overall amount of fluid remains unchanged, said change of the pistons 15, 18, 21, 24 is compensated by a downward movement of the pistons 27 and 30 of the compensation unit 6 in the same direction. In relation to the basic position shown in FIG. 3, the coupling element 9 is deflected in the direction of the translatory degree of freedom owing to the movement of the pistons 27 and 30 in the same direction. This means that no rotational deflection takes place.

The displacement of the pistons 27, 30 thus compensates the change in volume in the piston-cylinder units 2, 3, 4, 5 that occurs owing to the change in wheel loads.

Figure 6:
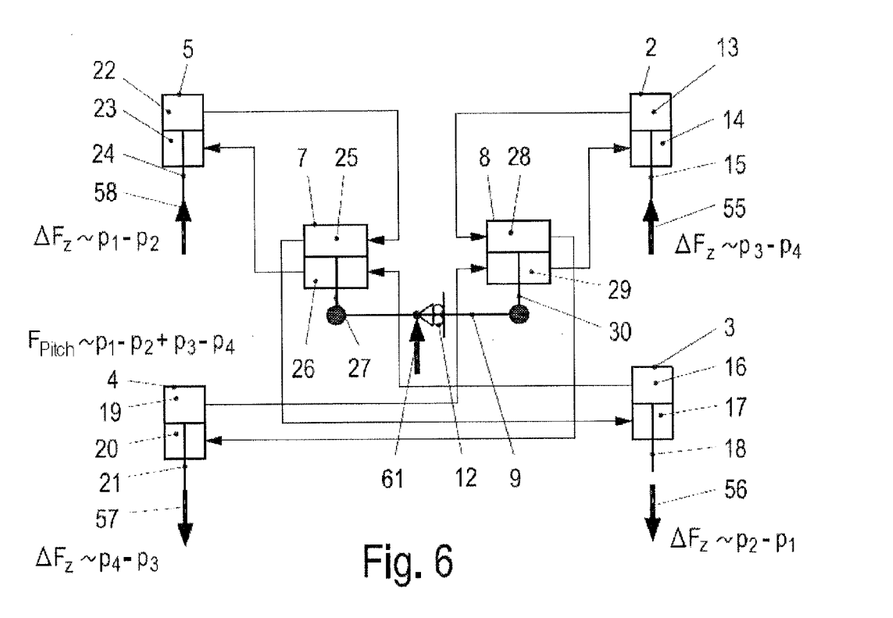
FIG. 6 shows a view as per FIG. 3, wherein the compensation of a pitching excitation is illustrated.

FIG. 6 shows a diagram of the device 1 in which no change in volume in the piston-cylinder units 2, 3, 4, 5 takes place, but rather the pressure change is compensated by an additional force component 61 exerted on the coupling element 9. The wheel load displacement that arises owing to the pitching action on the vehicle is fully compensated by means of said additional force component 61. The body thus remains in a settled central position.

Owing to the compensation by the force component 61, all of the pistons 15, 18, 21, 24 of the piston-cylinder units 2, 3, 4, 5 assigned to the wheels and also the pistons 27 and 30 of the compensation unit 6 are in their central position corresponding to the non-excited initial state of FIG. 3.

The generation of the force component 61 will be explained in the following FIG. 7.

Force components 55, 56, 57 and 58 are illustrated at the pistons 15, 18, 21 and 24. Said force components correspond to the wheel load change owing to the driver-induced pitching excitation. Here, the force components 55, 56, 57 and 58 are, as indicated in the formulae, proportional to the pressure differences arising within the piston-cylinder units 2, 3, 4, 5 between the respective upper volume 13, 16, 19, 22 and the respective lower volume 14, 17, 20, 23.

By contrast to the uncompensated pitching excitation in FIG. 5, the coupling element 9 has not been deflected out of its initial position as shown in FIG. 3. The force component 61 acts on the coupling element 9 such that both pistons 27 and 30 remain in their initial position.

Depending on the drive speed of the compensation unit 50, a situation may occur in which the coupling element 9 is initially pushed downward by means of the two pistons 27 and 30 owing to the pitching excitation, before a compensation by means of the force components 61 takes place and the coupling element 9 and thus the pistons 27 and 30 are displaced back into their initial position again.

As high a working speed as possible, which provides as short as possible a time period between the sensing of a pitching movement by first sensor element 62 and the generation of a compensating force component, is particularly desirable.

Overall, a movement of the body is prevented by means of said interconnection of the piston-cylinder units 2, 3, 4, 5 6, 7 and 8 and by means of the additional exertion of a force component 61 on the coupling element 9.

The force component 61, which is indicated by means of the formula reference $F_{pitch}$, is proportional to the changing pressure conditions in the respective piston-cylinder units 2, 5, which in turn are proportional to the changing wheel loads $\Delta Fz$. Consequently, by means of the additionally introduced force component 61, the movements that would arise owing to the changing wheel loads 55 and 58 are compensated, whereby the body as a whole remains in an unchanged central position.

Figure 7:
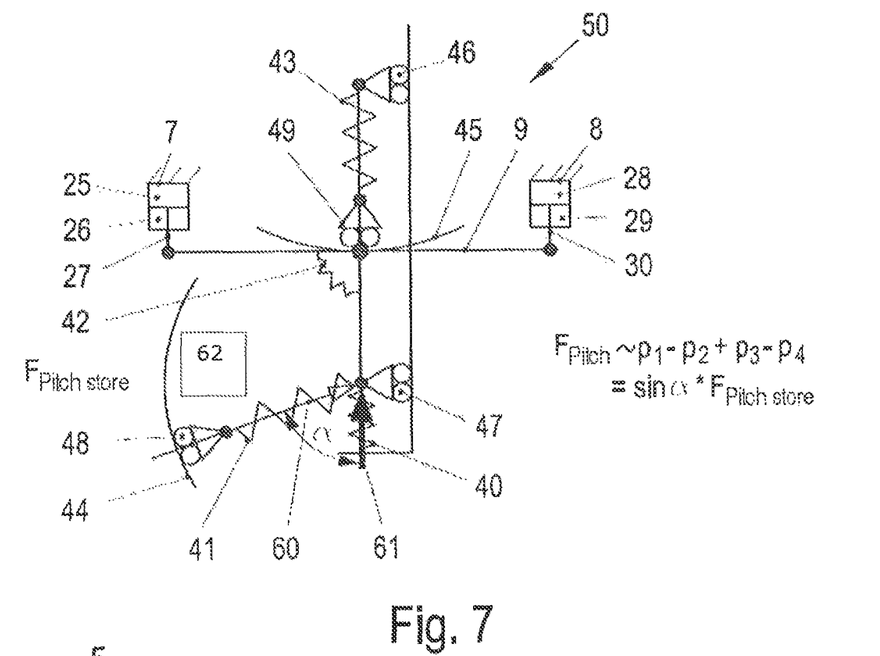
FIG. 7 is a schematic illustration of the compensation unit, wherein the compensation of a pitching excitation is illustrated.

FIG. 7 shows a detail view of the compensation unit 50, as has already been illustrated in FIG. 2. FIG. 7 shows a state of the compensation unit 50 in which an additional force component 61, which serves for compensating a pitching movement, is generated. The compensation unit 50 thus exhibits the excitation compensation that has already been shown in FIG. 6.

As already illustrated in FIG. 6, the force component 61 is proportional to the pressure differences which arise in the piston-cylinder units and which are proportional to the changes in wheel load at the wheels.

As already indicated in FIG. 2, the spring element 41 is preloaded. By means of a displacement of the spring mounting along the curved path 44, the direction of action of the force is changed. This yields a component, corresponding to the force arrow 61, along the translatory degree of freedom.

Said force component 61 compensates, so to speak, the movement of the coupling element 9 downward, whereby the coupling element 9 remains in the basic position and in a central position. As already described above, the degree of the actually occurring movement of the coupling element 9 is dependent on the working speed of the compensation unit 50.

As already mentioned, the spring element 41 is preloaded, and the force 61 acts in the direction of the initial position and not in the direction of the degree of freedom. The force component 61 is generated by virtue of the mounting 48 of the spring element 41 moving downward along the curved path 44. Since the line of force action of the spring element 41 is however not situated along the admissible movement direction of the coupling element 9, the result is an upwardly directed force component 61 of the force 60, acting along the spring element 41, defined by $\sin(\alpha)$ of the force 60. Here, the angle $\alpha$ is the angle between the force 60, which forms the hypotenuse in the force triangle, and the opposite side which is at right angles to the force component 61. Here, the force component 61 corresponds to the adjacent side of the force triangle.

Only said force component 61 of the force 60 can act in the translatory direction on the coupling element 9. Any other movement of the coupling element 9 is prevented by means of the other mountings, in particular the mountings 46 and 47.

As spring elements, use may be made of mechanical springs as shown in FIG. 7. In alternative embodiments, however, use may also be made of actuators which are adjusted by means of electric controllers and of hydraulic components. Here, the spring elements may be mechanically or else electronically driven by means of a control unit. It is important here that the force 61 is generated. In the case of electric or hydraulic actuators, these may be arranged directly in the direction of action.

FIG. 7 serves for illustrating the generation of the individual force components, and is not of a limiting nature with regard to the embodiment of the compensation unit 50. Also, in FIG. 7, the force 60 is indicated as $F_{pitch\ store}$.

Figure 8:
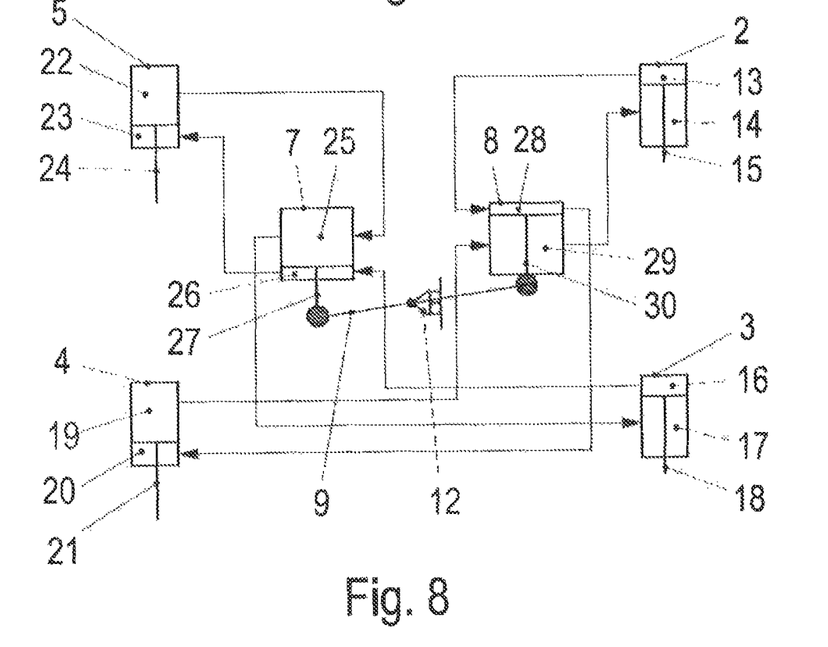
FIG. 8 shows a view as per FIG. 3, wherein a roadway-induced rolling excitation is illustrated.

FIG. 8 shows the device 1 in a state in which the vehicle is being subjected to a roadway-induced rolling excitation. In FIG. 8, as in FIG. 5, no active compensation of the rolling movement is being generated.

A rolling movement of the vehicle body results in the wheel loads changing from the left-hand side of the vehicle to the right-hand side of the vehicle. Whereas the wheel loads on one of the vehicle sides increase, the wheel loads on the opposite side of the vehicle decrease to the same extent.

In FIG. 8, the pressure in the upper volume 22 and in the upper volume 19 of the piston-cylinder units 5 and 4 is increased, whereby the fluid is displaced into the respective lower volume 23 or 20. By means of the piston-cylinder units 7 and 8, it is correspondingly the case in the right-hand piston-cylinder units 2, 3 that the respective upper volume 13 or 16 is decreased in size, whereas the lower volume 14 or 17 is increased in size. The pistons 24 and 21 of the left-hand piston-cylinder units 5, 4 are displaced downward, whereas the pistons 15 and 18 of the right-hand piston-cylinder units 2, 3 are displaced upward.

To compensate the change in volume in the individual piston-cylinder units 2, 3, 4, 5, the pistons 27 and 30 of the central piston-cylinder units 7 and 8 are moved in opposite directions. Here, the piston 27 is moved downward, whereas the piston 30 within the piston-cylinder unit 8 is moved upward. The result is an oblique position of the coupling element 9 about the centre of rotation of the mounting 12.

Figure 9:
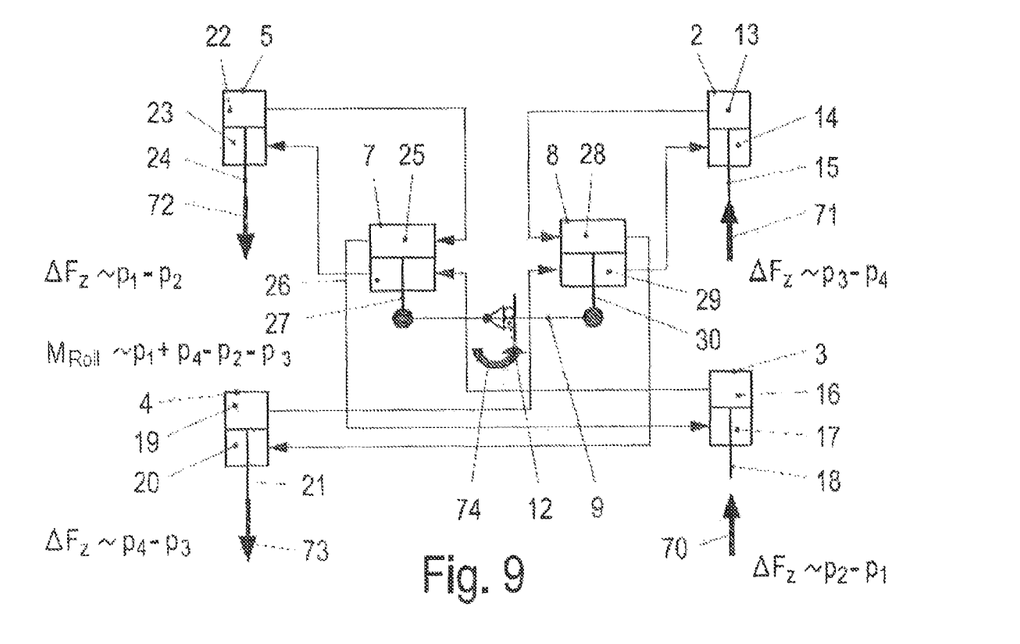
FIG. 9 shows a view as per FIG. 3, wherein the compensation of a rolling excitation is illustrated.

FIG. 9 finally shows a state of the device 1 in which, by means of active roll compensation, all of the pistons 15, 17, 21, 24 of the first four piston-cylinder units 2, 3, 4, 5 and also the pistons 27 and 30 of the central piston-cylinder units 7 and 8 are again situated in their central positions, corresponding to the initial position of FIG. 3.

The change of the wheel loads as a result of the rolling excitation in FIG. 9 is proportional to the difference in the pressures of the respective upper volume with respect to the lower volume of the individual piston-cylinder units 2, 3, 4, 5. Said pressure differences are in each case again proportional to the wheel load changes ΔFz that are indicated by means of the forces 70, 71, 72 and 73.

By means of the introduction of an additional moment 74, it is achieved that the coupling element 9 is not subjected to a rotation about the mounting 12. The pistons 27 and 30 of the central piston-cylinder units 7 and 8 likewise remain in their central position, which corresponds to the initial position of FIG. 3.

The moment 74 that is generated, said moment also being labeled $M_{Roll}$, is in this case proportional to the increasing pressures of the upper volume 22 and of the upper volume 19 on the left-hand side and of the lower volume 14 and of the lower volume 17 on the right-hand side. Said moment is likewise proportional to the decreasing pressures of the lower volume 23 and of the lower volume 20 of the left-hand side and of the upper volume 13 and of the upper volume 16 of the right-hand side. The exact generation of the moment 74 or $M_{Roll}$ is explained in FIG. 10.

Figure 10:
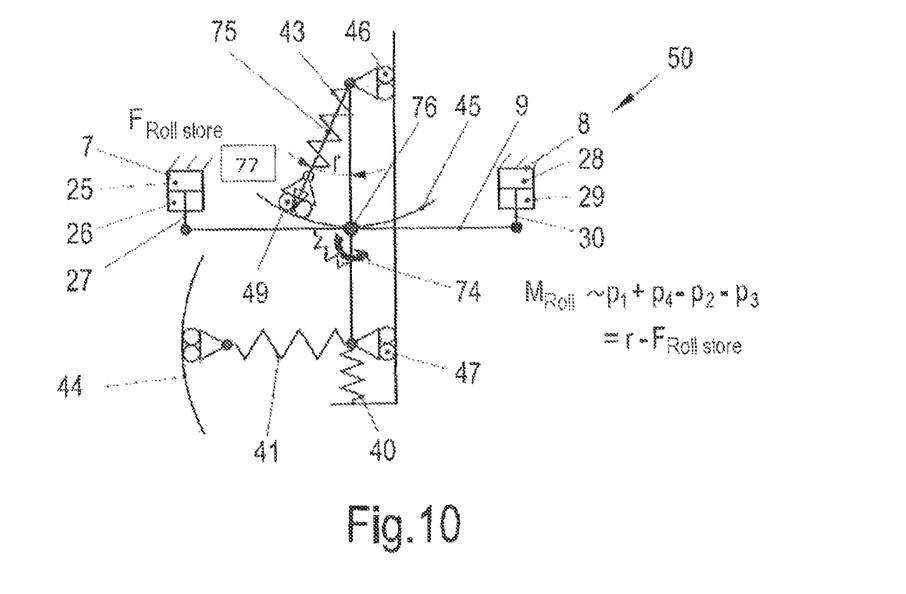
FIG. 10 is a schematic illustration of the compensation unit, wherein the compensation of a rolling excitation is illustrated.

FIG. 10 shows a detail view of the compensation unit 50 as has already been shown in FIG. 2 and FIG. 7. The reference signs correspond to those in the preceding illustrations of the compensation unit 50.

The moment 74 is realized by means of a deflection of the spring element 43 that is sensed by a second sensor element 77. Said spring element 43 is preloaded and is deflected out of the vertical along the curved path 45. A spring force 75 of the preloaded spring element 43 is also labeled $R_{Roll\ store}$ and already acts owing to the preload of the spring element 43. As a result of the deflection along the curved path 45, the direction of action of the spring force 75 along a degree of freedom changes. Since it remains the case that, by means of the mountings 46 and 47, the coupling element 9 can perform only a vertical movement and a rotation about the centre of rotation 76, only a moment 74 can act on the coupling element 9 as a result of the force 75.

Said moment 74 results from the force 75 multiplied by the lever arm r formed between the force vector of the force 75 and the centre of rotation 76. Here, the lever arm r is at right angles to the force 75 and intersects the centre of rotation 76.

Here, the moment 74 acts on the coupling element 9 such that it remains in its neutral starting position corresponding to FIG. 2. The moment 74 thus counteracts a rotation of the coupling element 9 that would arise as a result of a rolling movement analogous to FIG. 8. In this way, a compensation takes place, whereby the body of the vehicle as a whole remains in a neutral central position.

Here, too, the degree of actual deflection and movement of the coupling element 9 is in particular dependent on the working speed of the compensation unit 50.

As already described in FIG. 7, the spring elements of FIG. 10 may be formed by simple mechanical springs, by hydraulic components or else by electronically controlled actuators which exert corresponding forces on the compensation unit 50. It is important here that the force 75 is generated. In the case of electric or hydraulic actuators, the moment 74 may act directly about the centre of rotation 76.

All of the illustrations shown in FIGS. 1 to 10 serve merely for illustrating the principle. FIGS. 1 to 10 are not of a limiting nature with regard to the configuration of the individual components and/or the arrangement thereof with respect one another.

List of Reference Numerals

1 Device for the compensation of body movements
2 Piston-cylinder unit
3 Piston-cylinder unit
4 Piston-cylinder unit
5 Piston-cylinder unit
6 Compensation unit
7 Piston-cylinder unit
8 Piston-cylinder unit
9 Coupling element
10 Air spring
11 Auxiliary volume
12 Mounting
13 Volume
14 Volume
15 Piston
16 Volume
17 Volume
18 Piston
19 Volume
20 Volume
21 Piston
22 Volume
23 Volume
24 Piston
25 Volume
26 Volume
27 Piston
28 Volume
29 Volume
30 Piston
40 Spring element
41 Spring element
42 Spring element
43 Spring element
44 Curved path
45 Curved path
46 Mounting
47 Mounting 48 Mounting
49 Mounting
50 Compensation unit
55 Force
56 Force
57 Force
58 Force
59 Force
60 Force component
61 Force
62 First sensor element
70 Force
71 Force
72 Force
73 Force
74 Moment
75 Force
76 Centre of rotation
77 Second sensor element

What is claimed:

1. A device for the compensation of body movements in a motor vehicle comprising:
    first through fourth piston-cylinder units which are each assigned to a respective wheel of the motor vehicle,
    a compensation unit which has a fifth piston-cylinder unit and a sixth piston-cylinder unit, wherein pistons of the fifth piston-cylinder unit and of the sixth piston-cylinder unit are connected to one another via a coupling element, wherein at least one of the first through fourth piston-cylinder units and the fifth piston-cylinder unit are in fluid communication with one another and at least another of the first through fourth piston-cylinder units and the sixth piston-cylinder unit are in fluid communication with one another, and means for compensating for body movements,
    wherein each piston-cylinder unit has a piston which is axially movable in the cylinder, wherein a volume is defined at both sides of each piston, wherein the first piston-cylinder unit has a first volume and a second volume, the second piston-cylinder unit has a third volume and a fourth piston-cylinder unit has a seventh volume and an eighth volume, wherein the fifth piston-cylinder unit has a ninth volume and a tenth volume, and the sixth piston-cylinder unit has an eleventh volume and a twelfth volume,
    wherein the first to eighth volumes each have one fluid port, and the ninth to twelfth volumes each have two fluid ports, and
    wherein the eleventh volume is in fluid communication with the first volume and with the sixth volume, wherein the twelfth volume is in fluid communication with the second volume and the fifth volume, wherein the ninth volume is in fluid communication with the third volume and the eighth volume, wherein the tenth volume is in fluid communication with the fourth volume and the seventh volume.

2. The device for the compensation of body movements in a motor vehicle as claimed in claim 1, wherein the compensation unit is configured such that the piston of the fifth piston-cylinder unit and the piston of the sixth piston-cylinder unit are displaceable in either the same direction or in opposite directions.

3. The device for the compensation of body movements in a motor vehicle as claimed in claim 1, wherein coupling of the piston-cylinder units is realized such that supporting springs of the motor vehicle do not generate rolling or pitching moments.

4. The device for the compensation of body movements in a motor vehicle as claimed in claim 3, further comprising four air spring elements which are each assigned to a respective wheel of the motor vehicle and which each perform a function of a supporting spring, wherein the air spring elements are in fluid communication with one another and/or with a switchable auxiliary volume.

5. A device for the compensation of body movements in a motor vehicle comprising:
    first through fourth piston-cylinder units which are each assigned to a respective wheel of the motor vehicle,
    a compensation unit which has a fifth piston-cylinder unit and a sixth piston-cylinder unit, wherein pistons of the fifth piston-cylinder unit and of the sixth piston-cylinder unit are connected to one another via a coupling element, wherein at least one of the first through fourth piston-cylinder units and the fifth piston-cylinder unit are in fluid communication with one another and at least another of the first through fourth piston-cylinder units and the sixth piston-cylinder unit are in fluid communication with one another, and means for compensating for body movements,
    wherein the means for compensating for body movements has a first sensor element which senses a pitching movement of the body and/or has a second sensor element which senses a rolling movement of the body.

6. The device for the compensation of body movements in a motor vehicle as claimed in claim 5, wherein the means for compensating for body movements includes a first control element that exerts a force and/or a moment on the coupling element as a function of the sensed pitching movement, and/or has a second control element, which exerts a force and/or a moment on the coupling element as a function of the sensed rolling movement.

7. The device for the compensation of body movements in a motor vehicle as claimed in claim 6, wherein the first control element and/or the second control element is formed by an electronic unit and/or by a mechanical unit and/or by a hydraulic unit.

8. The device for the compensation of body movements in a motor vehicle as claimed in claim 5, wherein the first sensor element and/or the second sensor element is formed by an electronic unit and/or by a mechanical unit and/or by a hydraulic unit.

* * * * *